(12) United States Patent
Buhrmann

(10) Patent No.: US 6,405,032 B1
(45) Date of Patent: *Jun. 11, 2002

(54) SYSTEM AND METHOD FOR RETRIEVING MESSAGES FROM A VOICE MESSAGE SYSTEM

(75) Inventor: Michael Buhrmann, Redmond, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/766,134

(22) Filed: Dec. 17, 1996

(51) Int. Cl.[7] .............................. H04Q 7/20; H04Q 7/32
(52) U.S. Cl. ................. 455/413; 455/564; 455/420; 455/550; 379/67.1; 379/88.22; 379/88.23; 379/88.25
(58) Field of Search ............................ 455/564, 513, 455/512, 403, 419, 418, 420, 412, 422, 550, 575; 379/368, 67.1, 88.22, 88.23, 88.25

(56) References Cited

U.S. PATENT DOCUMENTS

| 4,866,764 A | * | 9/1989 | Barker, III ................. 379/368 |
| 5,317,627 A | | 5/1994 | Richardson et al. .......... 379/88 |
| 5,487,103 A | | 1/1996 | Richardson et al. .......... 379/88 |
| 5,493,604 A | * | 2/1996 | Hirayama ................... 455/564 |
| 5,561,705 A | * | 10/1996 | Allard et al. ............... 455/564 |
| 5,572,576 A | * | 11/1996 | Klausner et al. ............ 455/415 |
| 5,581,595 A | * | 12/1996 | Iwashita et al. ............ 455/564 |

FOREIGN PATENT DOCUMENTS

| DE | 42 33 066 C2 | | 10/1995 |
| EP | 0 679 041 A2 | | 4/1994 |
| JP | 7-240772 | | 9/1995 |
| JP | 048307914 A | * | 11/1996 |
| JP | 408307914 A | * | 11/1996 |

OTHER PUBLICATIONS

Austrian Search Report.

* cited by examiner

Primary Examiner—William Trost
Assistant Examiner—Keith Ferguson
(74) Attorney, Agent, or Firm—Klarquist Sparkman, LLP

(57) ABSTRACT

A communication device and method in which actuation of a function key, corresponding to at least one function associated with a remotely located voice messaging system, causes a command related to the actuated function key to be generated and sent to the voice messaging system. The predetermined function keys correspond to voice messaging system functions, such as listen to a message, skip a message, replay a message, delete a message, play a previous message, and fast forward through a message.

16 Claims, 3 Drawing Sheets

SYSTEM AND METHOD FOR RETRIEVING MESSAGES FROM A VOICE MESSAGE SYSTEM

BACKGROUND OF THE INVENTION

1. Field of the Invention

The present invention relates to the field of telecommunications. More particularly, the present invention relates to a system and a method for retrieving voice messages from a network voice message system.

2. Description of the Related Art

A conventional network voice mail system, or network voice messaging system, records messages at a facility connected to a telecommunications network for subscribers who are unavailable for answering a telephone call. A subscriber retrieves messages by calling a telephone number associated with the network voice message system to access the messaging system. The subscriber then enters identification information, and sends control commands into the system using the keys of a standard telephone keypad.

As another approach for retrieving messages and controlling a voice messaging service, U.S. Pat. No. 4,964,156 to Blair discloses a cellular telephone that automatically initiates a connection to a network voice mail system when the telephone is powered on. The cellular telephone automatically dials the telephone number of the voice mail system and sends user identifying information upon connection with the messaging system. Upon verification of the identifying information, the user conducts a conventional voice mail session for retrieving messages using the keys of a standard telephone keypad.

Other techniques for providing voice messaging-type services also exist. For example, U.S. Pat. No. Re. 34,976 to Helferich et al. discloses a cellular telephone that records voice messages in a memory in the cellular telephone when the telephone user is unavailable for answering a call. After a predetermined number of rings, the voice messaging circuitry within the telephone is activated for digitally recording a message in the memory of the cellular telephone so that the user can retrieve the message at a later time. According to Helferich et al., a voice mail message can be stored initially at a network voice mail system when the telephone user is unavailable for answering a call. The voice mail message is then transmitted to the memory of the cellular telephone at a later time using a high transmission rate, thereby reducing the air transmission time. This approach requires that the cellular telephone have sufficient memory for recording a useful amount of messages, thus making the cellular telephone more expensive for a user. Additionally, a user keys in an identification number using a standard telephone keypad to listen to a message recorded in he memory.

The conventional approach of retrieving messages and controlling remotely located voice messaging systems by using a standard telephone keypad is inconvenient because a user must interface with a network voice messaging system using a standard telephone keypad, while listening to an audible message providing a list of commands and/or system functions in a menu-type format.

SUMMARY OF THE INVENTION

The present invention provides a communication device having a convenient interface for controlling a remotely located voice messaging system. According to the invention, the communication device includes a keypad having function keys for controlling the network voice messaging system. The function keys include keys for listening to a message, fast forwarding through a message, rewinding a message, skipping a message, playing a previous message, and deleting a message, for example. A speed dial key can be included with the present invention for conveniently initiating access to the remote voice messaging system. In addition to providing a convenient interface to a network voice messaging system, the device of the present invention may also function as a conventional wireless telephone and/or voice paging device.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
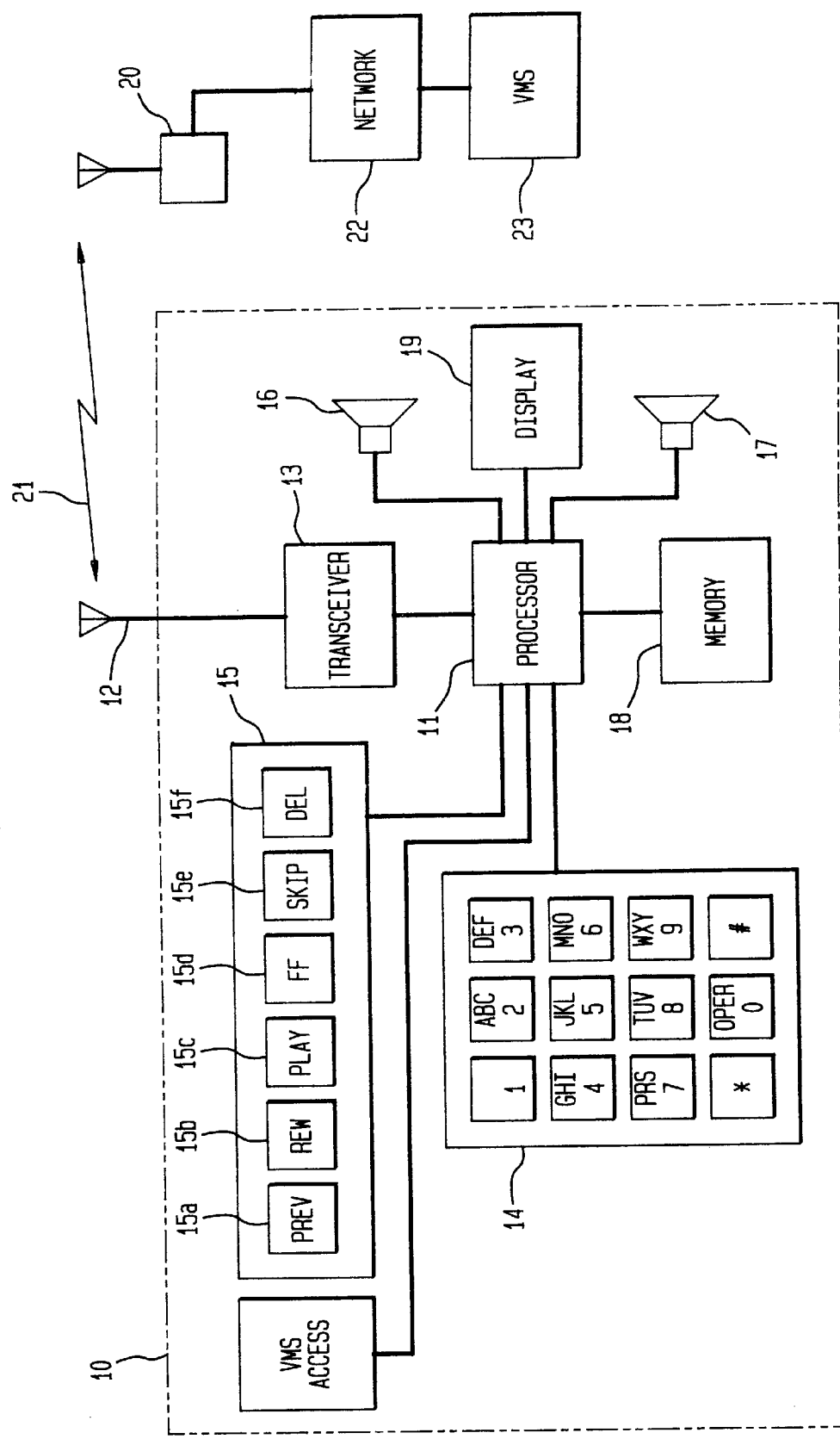
FIG. 1 shows a schematic block diagram of a first embodiment of a communication device according to the present invention.

FIG. 1 shows a schematic block diagram of a communication device 10, such as a cellular telephone or a personal communication device, having the features of the present invention. Communication device 10 is coupled to a base station 20 by wireless link 21. Base station 20 is connected to telecommunications network 22. A network voice messaging system 23 that is remotely located from communication device 10 is also connected to network 22. While communication device 10 is shown connected to telecommunications network 22 using a wireless link 21, communication device 10 can also be connected to network 21 using a landline connection.

Communication device 10 includes a processor or controller 11, an antenna 12, a transceiver 13, a standard keypad 14, a dedicated keypad 15, a VMS access key, a speaker 16, a microphone 17 and a memory 18 that stores instructions for processor 11. Processor 11 executes the instructions for controlling the functioning of communication device 10. Standard keypad 14 includes 12 touchtone keys labeled with the numbers 1–9, 0, * and #, and the alphabet. Function keypad 15 includes a plurality of keys in which each key corresponds to at least one function for controlling a network voice messaging system. VMS access key provides convenient speed dial-type access to remote voice messaging system 23 in a well-known manner.

Function keypad 15 of communication device 10, shown in FIG. 1, includes a plurality of dedicated keys each of which correspond to a function associated with a network voice messaging system. For example, keypad 15 includes key 15a for playing a previous message, key 15b for rewinding a message, key 15c for listening to a message, key 15d for fast forwarding through a message, key 15e for skipping a message, and key 15f for deleting a message.

When VMS access key is actuated, processor 11 generates DTMF tones for dialing the network voice messaging system and initiating access to the system in a well-known manner. Alternatively, one of the keys of keypad 14, such as key 1, can be actuated for a predetermined period of time for dialing the network voice messaging system and initiating access to the system. The DTMF dialing tones are transmitted in a well-known manner by antenna 12 and transceiver 13 over wireless communication link 21 to base station 20. Base station 20 connects the call to network 22, which in turn, routes the call to network voice messaging system 23 in a well-known manner. Once access to voice messaging system 23 has been initiated, processor 11 generates user identification information in DTMF tones for user identification verification at the system. When dedicated keys 15a–15f are actuated, processor 11 generates corresponding commands in DTMF tones for controlling the voice messaging system functions.

When key 15c is actuated for listening to a message, antenna 12 and transceiver 13 receive the message in a well-known manner over wireless communication link 21. Processor 11 then outputs the received message to speaker 16 for listening to by the user.

Communication device 10 can also include a display 19 coupled to processor 11 that can be used for providing a visual indication that a user has a message waiting at the network voice messaging system. Similarly, speaker 16 can be used for providing an audible indication that a message is waiting. The voice messaging system sends a message waiting signal to communication device 10 in a well-known manner that is received by antenna 12 and transceiver 13. Processor 11 stores the message waiting signal in memory 18 and displays the indication on display 19, or produces an audible indication using speaker 16.

Figure 2:
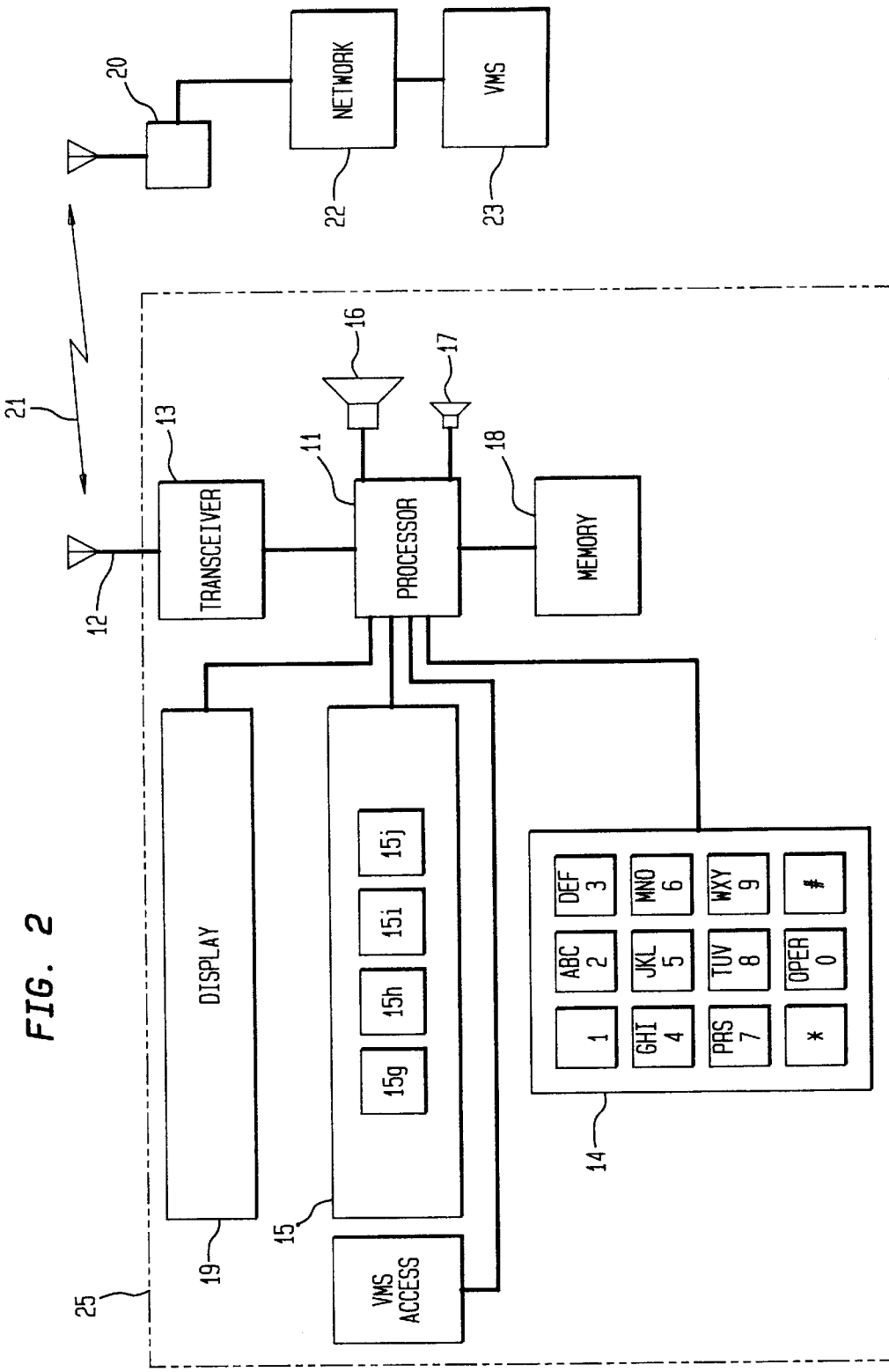
FIG. 2 shows a schematic block diagram of a second embodiment of a communication device according to the present invention.

FIG. 2 shows a schematic block diagram of a second embodiment of a communication device 25 that can be configured as a cellular telephone or a personal communication device. In this embodiment, the keys of function keypad 15 are soft keys that can be reconfigured by processor 11 to correspond to different voice messaging system functions. Display 19 is physically arranged with respect to function keypad 15 so that the specific function that a particular key corresponds to can be displayed adjacent to the key. When function keys 15g–15j are actuated, processor 11 generates commands in DTMF tones corresponding to the function associated with each key for controlling the voice messaging system.

Figure 3:
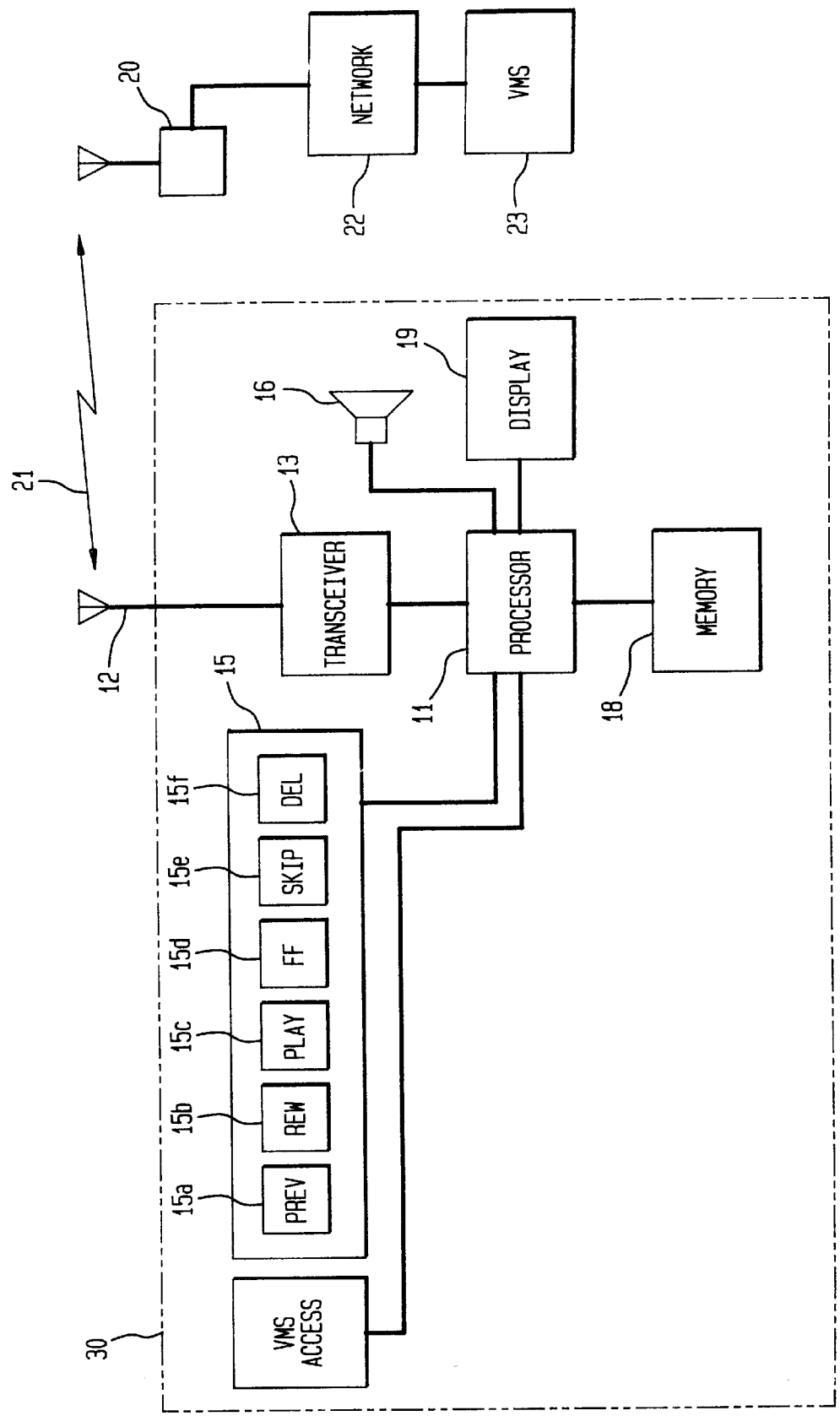
FIG. 3 shows a schematic block diagram of a third embodiment of a communication device according to the present invention.

FIG. 3 shows a schematic block diagram of a third embodiment of a communication device 30 that can be configured as a voice paging device. Communication device 30 is similar to communication devices 10 and 25, except that device 30 does not provide a keypad 14 and a microphone 17. Device 30 is not capable of placing a telephone call like devices 10 and 25, because communication device 30 is used only for interacting with a network voice messaging system. Consequently, communication device 30 is less costly to produce because it is simpler, smaller, and lighter. While communication device 30 is shown with dedicated function keys 15a–15f, soft keys can also be used.

While the present invention has been described in connection with the illustrated embodiments, it will be appreciated and understood that modifications may be made without departing from the true spirit and scope of the invention.

What is claimed is:

1. A communication device comprising:
   at least one dedicated function key corresponding to at least one voice messaging function to be remotely performed by a remotely-located voice messaging system that is separated from said communication device and to which a user of said communication device subscribes; and
   a controller responsive to actuation of said at least one dedicated function key by generating a command corresponding to said at least one voice messaging function whereby a message stored in said remotely-located voice messaging system is remotely manipulated by way of said command,
   wherein the at least one dedicated function key corresponds to at least one voice messaging system function to be remotely performed, the function being selected from a group of voice messaging functions consisting of: listen to a message, skip a message, replay a message, delete a message, play a previous message, and fast forward through a message.

2. The communication device according to claim 1, wherein the controller establishes a communication link with the voice messaging system.

3. The communication device according to claim 2, wherein the communication link is established in a telecommunications network by the controller dialing a predetermined telephone number associated with the voice messaging system.

4. The communication device according to claim 3, wherein the communication link is a wireless communication link, and
   wherein the communication device further comprises a transceiver device coupled to the controller and transmitting the command.

5. The communication device according to claim 1, further comprising a voice messaging system access key, the controller responding to actuation of the voice messaging system access key by establishing the communication link with the voice messaging system.

6. The communication device according to claim 1, further comprising an audible output device coupled to the controller and generating an audible output signal in response to receipt of a message from the voice messaging system.

7. The communication device according to claim 1, wherein the communication device is a cellular telephone.

8. The communication device according to claim 1, wherein the communication device is a personal communication device.

9. The communication device according to claim 1, wherein the communication device is a voice paging device that does not include a keypad or a microphone.

10. A method for controlling a network voice messaging system, comprising the steps of:
    generating a command in response to actuation of a dedicated function key corresponding to a voice messaging function to be remotely performed by a remotely-located voice messaging system that is separated from said dedicated function key, said dedicated function key being actuated by a subscriber to said remotely-located voice messaging system;
    sending the command to said remotely-located voice messaging system; and
    remotely manipulating a message stored in said remotely-located voice messaging system by way of said command,
    wherein the at least one dedicated function key corresponds to a voice messaging system function to be remotely performed, the function being selected from a group of voice messaging functions consisting of: listen to a message, skip a message, replay a message, delete a message, play a previous message, and fast forward through a message.

11. The method according to claim 10, further comprising the step of establishing a communication link with the voice messaging system before the step of sending the command.

12. The method according to claim 11, wherein the step of establishing the communication link includes the step of dialing a predetermined telephone number associated with the voice messaging system.

13. The method according to claim 12, wherein the step of dialing the predetermined telephone number is performed in response to actuation of a voice messaging system access key.

14. The method according to claim 10, further comprising the step of generating an audible output signal in response to receipt of a message from the voice messaging system.

15. The communication device according to claim 1, wherein the at least one function key—has been added.

16. The communication device according to claim 1, wherein the at least one function key is a soft key—has been added.

* * * * *

UNITED STATES PATENT AND TRADEMARK OFFICE
CERTIFICATE OF CORRECTION

PATENT NO. : 6,405,032 B1
DATED : June 11, 2002
INVENTOR(S) : Michael Buhrmann

It is certified that error appears in the above-identified patent and that said Letters Patent is hereby corrected as shown below:

Title page,
Item [56], References Cited, FOREIGN PATENT DOCUMENTS, "JP 048307914 A * 11/1996" should be deleted.

Column 1,
Line 54, "he" should read -- the --.

Column 2,
Line 58, "system. For" should read -- system, initiating a connection with the network voice messaging system or controlling operation of the voice messaging system after a connection has been established. For --.

Column 6,
Line 5, "–has been added" should be deleted.
Lines 7-8, "–has been added" should be deleted.

Signed and Sealed this

Twenty-eighth Day of June, 2005

JON W. DUDAS
*Director of the United States Patent and Trademark Office*